United States Patent [19]

Morgan

[11] Patent Number: 4,594,057
[45] Date of Patent: Jun. 10, 1986

[54] INJECTOR PUMP

[75] Inventor: Morris E. Morgan, Valencia, Calif.

[73] Assignee: Morgan Products, Inc., Valencia, Calif.

[21] Appl. No.: 742,935

[22] Filed: Jun. 10, 1985

[51] Int. Cl.[4] .............................................. F04B 9/10
[52] U.S. Cl. ...................................... 417/385; 92/168; 417/383
[58] Field of Search ............... 417/383, 384, 385, 386, 417/387, 388; 277/3, 27, 205; 92/168

[56] References Cited

U.S. PATENT DOCUMENTS

| | | | |
|---|---|---|---|
| 1,101,266 | 6/1914 | Franklin | 417/388 |
| 2,377,251 | 5/1945 | Le Clair | 417/387 |
| 2,856,857 | 10/1958 | Saalfrank | 417/385 |
| 2,975,599 | 3/1961 | Bennett | 92/168 X |
| 3,149,469 | 4/1962 | Williams | 417/387 X |
| 3,738,665 | 6/1973 | Bilco | 277/27 X |
| 4,370,996 | 2/1983 | Williams | 137/99 |

OTHER PUBLICATIONS

Milton Roy brochure.
Morgan Products catalog, Pneumatic Chemical Injectors.
Williams Instrument Company, Inc. brochure, 1278-1c, 1980.
Bal Seal Engineering Company brochure, HP-1A.

Primary Examiner—Leonard E. Smith
Attorney, Agent, or Firm—Harris, Kern, Wallen & Tinsley

[57] ABSTRACT

An injector pump for introducing metered amounts of fluid into a process line which pump typically is actuated by a gas powered timing relay. A diaphragm or other impermeable member mounted in the pump housing defining a pump chamber for the fluid to be pumped and a piston chamber for a piston having a plunger sliding in a plunger guide to define a pressure chamber between the plunger and the diaphragm. A high pressure seal is carried in the plunger guide to provide sealing about the plunger when there is a high pressure in the pressure chamber, while permitting leakage along the plunger when there is a low pressure in the pressure chamber, thereby providing for pumping of measured amounts of fluid which may be under high pressure and/or highly corrosive, while maintaining isolation between the pump mechanism and the fluid.

16 Claims, 6 Drawing Figures

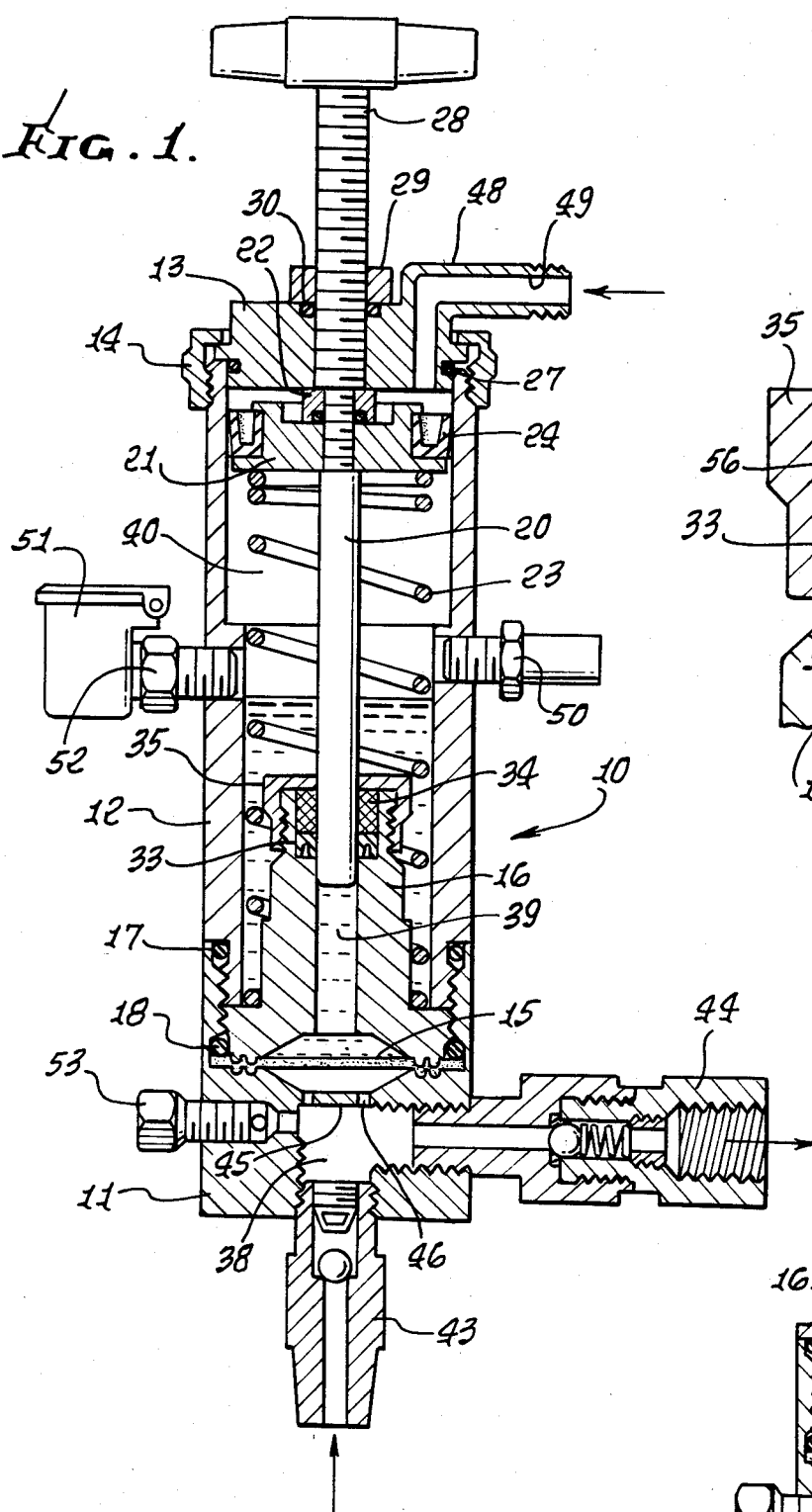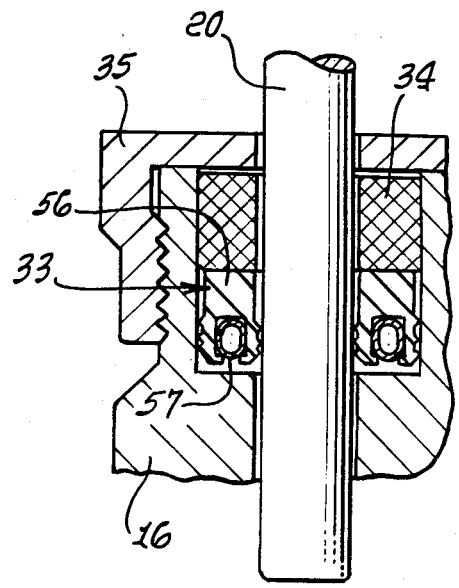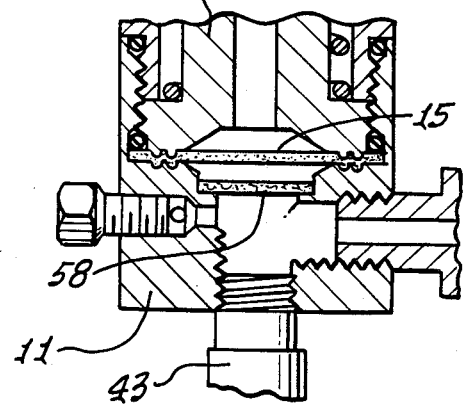

INJECTOR PUMP

BACKGROUND OF THE INVENTION

This invention relates to pumps of the type used for introducing controlled amounts of a reagent into a process stream. These devices are typically referred to as chemical injectors and are used in a variety of manufacturing facilities for introducing metered amounts of fluid into another fluid stream, typically small amounts of a reagent into a process stream. One such chemical injection system is shown in U.S. Pat. No. 4,370,996, which system includes a gas powered timing relay and an injector pump, with the timing relay providing gas under pressure at controlled intervals for actuating the pump. Typically the pumps are controlled by such timing relays, and one such relay is shown in said U.S. Pat. No. 4,370,996, and another timing relay is shown in U.S. Pat. No. 4,465,090.

The reagents with which the injector pumps are used often are highly toxic or caustic or corrosive material, and often have strong odors. The caustic and corrosive materials tend to damage the pumps and hence it is desirable to avoid any contact between the reagent and the pump mechanism. Also, it is desirable to avoid leakage of the toxic materials and materials with strong odors, as well as leakage of the caustic and corrosive materials. In general, two types of pumps have been used in the past.

In one type of pump, the process stream is introduced into a pump chamber through a first check valve and exits from the pump chamber through a second check valve, with the pumping action being obtained by a positive displacement plunger which reciprocates in the pump chamber. With this type of construction, the plunger is in direct contact with the reagent, and seals are provided about the plunger for limiting leakage of the reagent along the plunger into the pump mechanism. High pressure seals are required in this type of pump, with a high back pressure in order to reduce the leakage. However, the reagent being in direct contact with the seals severely limits the effective operating life of the seals.

Typical pumps of this type include the Williams Instrument Company, Inc. Chemical Injector Models P250D and P500D and the Morgan Products Chemical Injector Models 50DS through 550DS.

Another type of injector pump or controlled volume pump utilizes an impermeable diaphragm between the pump plunger and the pump chamber, with movement of the pump plunger or piston causing movement of the diaphragm and hence obtaining the pumping action. Since this is a positive displacement type of pump, some type of bypass configuration is required in order to obtain the diaphragm displacement without damage to the diaphragm. This is achieved in existing pumps by means of a complex fluid bypass passage and valve system.

One such configuration is shown in U.S. Pat. No. 3,149,469, and one such diaphragm pump is produced by the Milton Roy Company as a Controlled Volume Pump.

It is an object of the present invention to provide a new and improved injector pump which will pump metered amounts of fluid for introduction into a process line, which pump incorporates a diaphragm or other impermeable member isolating the pumped material from the pump mechanism. A further object of the invention is to provide such an injector pump which is operable with the impermeable member without requiring any fluid bypass valving configuration for obtaining pump operation.

It is a further object of the invention to provide such an injector pump which can utilize various types of impermeable members, including diaphragms, bellows and Bourdon tubes. An additional object is to provide such an injector pump which can be operated with a single gas pressure inlet, or with dual gas pressure inlets for reciprocating motion, or with mechanical type drives.

Other objects, advantages, features and results will more fully appear in the course of the following description.

SUMMARY OF THE INVENTION

An injector pump for introducing metered amounts of fluid into a process line and the like, including a flexible and fluid impermeable member mounted in a housing to define a pump chamber and a piston chamber in the housing. A piston is positioned in the piston chamber, with a piston plunger sliding in a plunger guide carried in the piston chamber, with the plunger defining a pressure chamber between the plunger and the impermeable member. A high pressure seal is carried in the plunger guide with the plunger sliding in the seal, and some means is provided for moving the piston toward and away from the impermeable member. The high pressure seal leaks fluid along the plunger when the fluid between the plunger and the impermeable member is under low pressure providing a low pressure across a high pressure seal. Conversely, the high pressure seal seals about the plunger to prevent fluid leakage along the plunger when the fluid between the plunger and the impermeable member is under high pressure which results from movement of the piston plunger toward the impermeable member.

BRIEF DESCRIPTION OF THE DRAWINGS

FIG. 1 is a sectional view through an injector pump incorporating the presently preferred embodiment of the invention;

FIG. 2 is an enlarged partial sectional view of the pump of FIG. 1 illustrating one form of high pressure seal;

FIG. 3 is a partial sectional view similar to that of FIG. 1 showing an alternative construction for the pump chamber;

DESCRIPTION OF THE PREFERRED EMBODIMENTS

Figure 4:
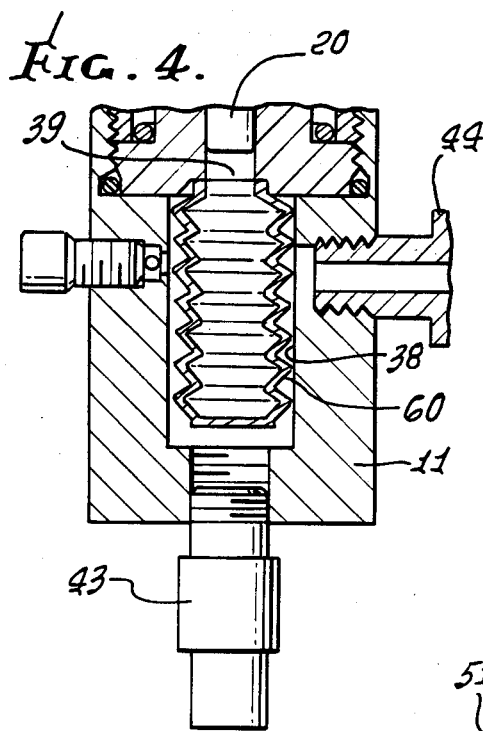
FIG. 4 is a partial sectional view similar to that of FIG. 1 showing the use of a bellows in place of the diaphragm.

The injector pump in the embodiment illustrated in FIG. 1 includes a housing formed with a plurality of components comprising a base 11, a sleeve 12, a top 13, and a ring 14. A diaphragm 15 and a piston plunger guide 16 are clamped between the sleeve 12 and base 11 by the threaded engagement of the sleeve with the base.

Conventional O-rings 17, 18 are installed prior to assembly. The diaphragm 15 is a flexible and fluid impermeable member which may be of conventional construction.

A piston plunger 20 is threaded into a piston 21 and held in place by a lock nut 22. A spring 23 is positioned about the plunger 20 within the sleeve 10. The piston 21 carries a seal 24 for slidingly sealing with the inner wall of the housing sleeve 12.

The housing top 13 is held in place on the sleeve 12 by the threaded engagement of the cap 14 with th upper end of the sleeve, with an O-ring seal 27 therebetween. A threaded shaft 28 is threadedly engaged with the top 13, and is locked in place by another lock nut 29, with another O-ring seal 30 about the shaft.

A high pressure seal 33 and a back up ring 34 are carried in a cavity in the plunger guide 16, with the seal and ring being held in place by a cup 35 threaded onto the upper end of the plunger guide 16.

This assembly provides a pump chamber 38 in the housing base 11 which is separated from the pressure chamber 39 by the diaphragm 15. The diaphragm and the lower end of the piston plunger 20 serve to define the pressure chamber 39. The piston 21 slides in the piston chamber 40 of the housing.

An inlet check valve 43 and an outlet check valve 44 are mounted on the housing base 11 to provide for fluid flow into and out of the pump chamber 38, respectively. In the embodiment illustrated, the housing base 11 includes a plate section 45 positioned adjacent the diaphragm 15, with the plate having a plurality of apertures 46 for free flow of fluid from one side of the plate section to the other. The plate section provides strength while making the base 11 easier to manufacture.

The housing top 13 includes a boss 48 with a passage 49 therein for providing communication between the exterior of the housing and the piston chamber above the piston. A plug 50 is threadedly mounted in the sidewall of the sleeve 12 and has one or more openings so as to serve as a breather or vent for the piston chamber. A container 51 is carried on another plug 52 also threadedly mounted on the wall of the sleeve 12. A bleeder plug 53 for the pump chamber 38 is threadedly mounted in the housing base 11.

In operation, the reservoir 51 is filled with a liquid, typically an inert oil, so that the lower portion of the piston chamber is filled with the oil. The spring 23 moves the piston upward to engage the top 13 or the lower end of the shaft 28, with the shaft being rotatable to move the lower end up and down and thereby limit the length of the stroke of the piston, and thus control the amount of reagent pumped with each stroke. When gas under pressure is introduced at the passage 49, the piston is moved downward, compressing the spring 23. When the gas pressure is released, the spring moves the piston back upward to the position of FIG. 1. Typically the timing of operation, that is, the rate of piston strokes, is controlled by an air relay of the type previously identified.

When the piston plunger 20 moves downward, the liquid in the pressure chamber 39 moves the diaphragm 15 downward forcing reagent from the pump chamber 38 outward through the check valve 44. When the piston plunger 20 moves upward, the diaphragm returns to the normal position shown in FIG. 1, and reagent is sucked into the pump chamber 38 through the ckeck valve 43.

When the piston plunger 20 starts moving downward, there is a relatively low pressure on the liquid on the pressure chamber 39. Under this condition, the high pressure seal 33 permits leakage of the liquid upwardly along the plunger into the piston chamber 40. However, as the plunger continues to move downward, pressure in the pressure chamber increases, and the high pressure seal functions to provide a seal about the plunger and thereby retain the remaining liquid in the pressure chamber. Then further plunger movement moves the diaphragm 15 downward. Similarly, when the plunger starts moving in the upward direction, there is a reduction in pressure in the pressure chamber 39 and the high pressure seal again leaks, with liquid now moving downward along the plunger from the piston chamber 40 into the pressure chamber 39. The leaking action of the seal 33, while being very slight, causes the volume of liquid in the pressure chamber 39 to be self regulating, so long as there is a blanket of the liquid above the seal 33.

The piston operates at very low pressures, typically in the range of about 10–100 psi, although there is no theoretical limit. The lower limit is determined by the amount of pressure required to move the piston and the upper limit by the pressure which the structure will withstand. The significant characteristic here is that the sealing operation and the pumping operation is achieved without requiring any particular back pressure in the piston chamber. The pumped reagent typically under a higher pressure, usually in the range of about 300–1500 psi. However, again here there is no particular limit for the lower range or the upper range. The upper limit on the pressure of the pump reagent is the rupture strength of the impermeable member.

The high pressure seal 33 is a conventional unit and typically is designed for operation in the range of 10,000–100,000 psi. It has been determined that this type of seal will leak at relatively low pressures, and in the preferred embodiment of the present invention, seals desirable leak at pressures in the range of about 10–100 psi. Here again, these are not specific limitations and an injector pump could be operated satisfactory with a high pressure seal which leaked at pressures as high as 300 psi.

In operation, the high pressure seal leaks fluid along the plunger when the fluid between the plunger and the impermeable member is under low pressure which provides a low pressure across the high pressure seal. This condition exists when the plunger is at rest, and when the plunger initially starts its downward movement. However, the high pressure seal provides a fluid tight seal with a fluid tight sliding seal about the plunger for preventing fluid leakage along the plunger when the fluid in the pressure chamber is under high pressure which results from movement of the piston toward the impermeable member. As stated above, this operation is achieved without control of the back pressure in the piston chamber or control of pressure in the pump chamber, and without requiring any bypass passages and valving.

The high pressure seal 33 may be a conventional commercial product, and several are available on the market. One such seal is shown in greater detail in FIG. 2. The seal includes a seal ring 56 formed of a resilient material having no elastic memory, typically a graphite filled Teflon synthetic. The ring 56 has a U-shaped cross-section with the open end of the U at one end of the ring. The seal is installed with this open end facing the high pressure source, which is the pressure chamber 39 in the configuration of FIG. 1. Preferably a stiffner ring 57 is positioned within the seal ring 56 for the purpose of preventing the two arms of the U-shaped cross-section from collapsing toward each other.

In operation, the fluid under pressure will move upward along the plunger 20 and into the open portion of the U-shaped cross-section, thereby forcing the arms of the U outward into sealing engagement with the plunger and with the plunger guide. However, this sealing action does not occur at low pressures, and hence there is leakage along the plunger until pressure has built up.

These high pressure seals are available from a number of sources, including the Bal-seal from Bal Seal Engineering Company, the RSA Seal from Green, Tweed, the OMNI SEAL from Aeroquip Corporation, the Variseal M from American Variseal Corp. and the Raco Seal from Fluorocarbon Co.

An alternative construction for the embodiment of FIG. 1 is shown in FIG. 3, wherein the plate 45 is replaced by a porous disc 58. This porous disc may be of conventional construction, and one such device is available on the market as a disc comprising a plurality of metal balls sintered together. This type of porous disc is used as a filter and provides a strong mechanical construction which will withstand high pressures, and at the same time provide adequate fluid flow therethrough. Another suitable porous disc is a section of wire mesh or screen cut to the appropriate shape.

Another alternative configuration is shown in FIG. 4, where the diaphragm 15 is replaced by a bellows 16. The bellows functions as a flexible and fluid impermeable member in the same manner as the diaphragm, with the interior of the bellows providing a portion of the pressure chamber 39. When the plunger moves downward the liquid in the pressure chamber 39 causes the bellows to expand and exhaust reagent from the pump chamber 38. Similarly an upward movement of the plunger causes the bellows to retract and draw reagent into the pump chamber.

Figure 5:
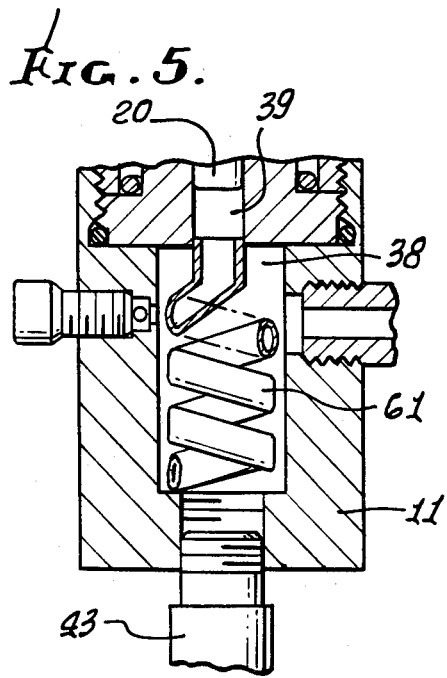
FIG. 5 is a partial section view similar to that of FIG. 4 showing a Bourdon tube in place of the diaphragm.

Another embodiment is shown in FIG. 5, with a Bourdon tube 61 used in place of the bellows 60. The operation is the same, with the Bourdon tube changing cross-section shape from elliptical toward circular, thereby increasing the volume of the interior of the Bourdon tube and reducing the remaining volume of the pump chamber.

Figure 6:
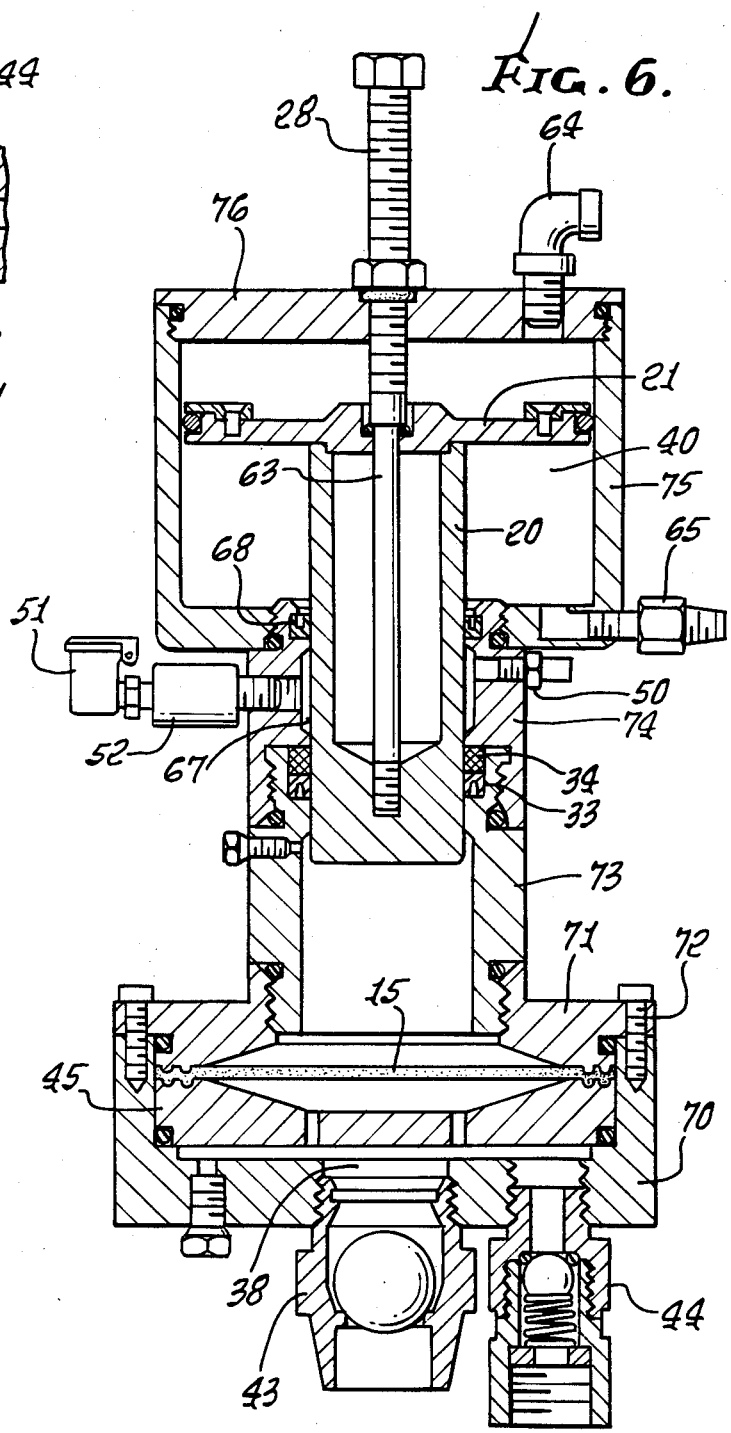
FIG. 6 is a sectional view of an injector pump similar to that of FIG. 1, but being powered in both directions by gas under pressure.

Another alternative of the embodiment is shown in FIG. 6, where the piston 21 is moved both upward and downward by gas under pressure. The housing is constructed somewhat differently, including a base 70, a clamp ring 71 attached to the base 70 by bolts 72 and holding the diaphragm 15 in place, a plunger guide 73, a sleeve 74, a cylinder 75 and a top 76, with the top, cylinder, sleeve, plunger guide and clamp ring joined by threaded engagement, with O-ring seals therebetween. In this housing the plate 45 is formed separately from and is positioned within the base 70. The high pressure seal 33 and seal ring 34 are clamped between the sleeve 74 and the plunger guide 73.

In this embodiment, the piston plunger 20 is attached to the piston 21 by a bolt 63. A fitting 64 provides for gas flow into and out of the upper portion of the piston chamber 40 and another fitting 65 provides for gas flow into and out of the lower portion of the piston chamber. Hence gas under pressure introduced at fitting 64 moves the plunger downward, and gas under pressure at the fitting 65 moves the plunger upward.

The vent plug 50 and oil reservoir plug 52 are mounted in the housing sleeve 74 opening into an annular zone 67 defined by the seal 33 and another seal 68. The seal 68 is a low pressure seal for sealing the lower portion of the piston chamber when gas under pressure is introduced to move the piston upward. The operation of the injector pump of FIG. 6 is the same as that described for the injector pump of FIG. 1. While the pumps as illustrated are operated by gas under pressure, it is readily understood that the piston plunger could be moved by a mechanical drive which would replace the adjustable stop shaft 28.

I claim:

1. In an injector pump for introducing metered amounts of fluid into a process line or the like, the combination of:
    a housing;
    a flexible and fluid impermeable member mounted in said housing defining a pump chamber and a piston chamber in said housing;
    a piston positioned in said piston chamber and having a piston plunger;
    said housing including a piston plunger guide carried in said piston chamber with said piston plunger slidingly positioned in said guide defining a pressure chamber between said plunger and said impermeable member;
    a high pressure seal carried in said plunger guide, with said plunger sliding in said high pressure seal, and with said pressure chamber closed by said impermeable member, said piston plunger and said high pressure seal; and
    means for moving said piston toward and away from said impermeable member;
    with said high pressure seal including means for leaking fluid along said plunger when fluid between said plunger and impermeable member is under low pressure providing a low pressure across said high pressure seal, and for sealing about said plunger to prevent fluid leakage along said plunger when fluid between said plunger and impermeable member is under high pressure resulting from movement of said piston toward said impermeable member providing a high pressure across said high pressure seal.

2. A pump as defined in claim 1 including first and second check valves connected to said housing, with said first check valve providing for fluid flow into said pump chamber and said second check valve providing for fluid flow out of said pump chamber.

3. A pump as defined in claim 1 wherein said means for moving said piston includes
    a spring positioned in said piston chamber about said piston plunger for urging said piston in one direction, and
    means defining a fluid inlet for introducing fluid into said housing for urging said piston in the opposite direction.

4. A pump as defined in claim 1 including means defining first and second fluid inlets in said piston chamber on opposite sides of said piston for fluid flow into and out of said piston chamber, with the pressure differential across said piston moving said piston.

5. A pump as defined in claim 1 wherein said piston includes a second seal for sliding engagement with the wall of said piston chamber.

6. A pump as defined in claim 5 wherein said housing includes means for venting a zone of said piston chamber to ambient pressure.

7. A pump as defined in claim 6 including a liquid reservoir connected to said housing for supplying a liquid to said zone of said piston chamber.

8. A pump as defined in claim 1 wherein said impermeable member is a diaphragm.

9. A pump as defined in claim 8 including an apertured plate positioned in said pump chamber adjacent said diaphragm.

10. A pump as defined in claim 8 including a porous disc positioned in said pump chamber adjacent said diaphragm.

11. A pump as defined in claim 1 wherein said impermeable member is a bellows.

12. A pump as defined in claim 1 wherein said impermeable member is a Bourdon tube.

13. A pump as defined in claim 1 wherein said high pressure seal includes a seal ring having a U-shaped crosssection open at one end of said ring, with said open end facing toward said pressure chamber.

14. A pump as defined in claim 13 including a stiffner ring positioned within said seal ring.

15. A pump as defined in claim 14 including a back up ring positioed about said plunger at the end of said high pressure seal opposite said open end.

16. A pump as defined in claim 1 wherein said high pressure seal leaks fluid about said plunger at pressures below about 100 psi.

* * * * *